(12) United States Patent
Aritomi

(10) Patent No.: US 6,407,760 B1
(45) Date of Patent: Jun. 18, 2002

(54) INFORMATION PROCESSING APPARATUS HAVING A MENU DISPLAY FUNCTION, AND USER-INTERFACE CONTROL METHOD

(75) Inventor: Masanori Aritomi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/150,250

(22) Filed: Sep. 10, 1998

(30) Foreign Application Priority Data

Sep. 24, 1997 (JP) ............................................. 9-274998

(51) Int. Cl.⁷ ................................................ G06F 3/00
(52) U.S. Cl. ........................ 345/810; 818/841; 818/853; 818/855
(58) Field of Search ................................. 345/352, 353, 345/354, 356, 810, 818, 841, 853, 855

(56) References Cited

U.S. PATENT DOCUMENTS

| | | | | |
|---|---|---|---|---|
| 5,504,853 A | * | 4/1996 | Schuur et al. ............... | 345/356 |
| 5,559,945 A | * | 9/1996 | Beaudet et al. ............. | 345/353 |
| 5,701,137 A | * | 12/1997 | Kiernan et al. ............. | 345/340 |
| 5,917,492 A | * | 6/1999 | Bereieter et al. ........... | 345/357 |
| 6,121,966 A | * | 9/2000 | Teodosio et al. ........... | 345/346 |

OTHER PUBLICATIONS

Windows NT 4.0 Explorer (1996).*

* cited by examiner

*Primary Examiner*—Raymond J. Bayerl
*Assistant Examiner*—Sy D. Luu
(74) *Attorney, Agent, or Firm*—Fitzpatrick, Cella, Harper & Scinto

(57) ABSTRACT

An information apparatus allows shift to a setting object, such as a dialog or a window having a specific setting item, even if the number of set items is large. In an user interface in the information processing apparatus, the configuration of a menu is checked, and a block menu in which the configuration of the menu is represented by blocks is displayed. When the user performs action for a control item in the block menu, the corresponding menu item is segmented and displayed. The display of the control item at the current position and the display of a link line to the control item change, so that the position of the control item in the menu configuration can be grasped.

26 Claims, 12 Drawing Sheets

INFORMATION PROCESSING APPARATUS HAVING A MENU DISPLAY FUNCTION, AND USER-INTERFACE CONTROL METHOD

BACKGROUND OF THE INVENTION

1. Field of the Invention

The present invention relates to an information processing apparatus, such as a personal computer, a work station or the like, a user-interface control method, and a storage medium.

2. Description of the Related Art

Conventional user interfaces for information processing apparatuses are configured so as to execute processing by selecting a command from a menu, or by selecting an icon from a tool bar.

Such user interfaces can also perform various settings by displaying a plurality of items on a dialog box (window) followed by the user's input for each item. When there are many setting items on such a dialog box (window), child dialog boxes are opened and displayed from the main dialog box (window) in order to permit the user to see and set more detailed menu of items. In a display method using a dialog box, it is possible to understandably display correlation among setting items within each dialog box.

FIG. 11 is a diagram illustrating a conventional menu display using a dialog. A main dialog 300 has a "menu 1 . . . " button 301 and a "menu 2 . . . " button 302.

By depressing the "menu 1 . . . " button 301, a "menu 1" dialog 310 is opened. The dialog 310 has three group boxes, i.e., an "A-group box" 320, a "B-group box" 330, and a "C-group box" 340.

The "A-group box" 320 has two radio button controls 321 for selecting one of setting 1 and setting 2. The "B-group box" 330 has a "check box 3" 331 and a "list box 4" 333 for performing control. The setting for the "check box 3" 331 includes ON/OFF, and the setting for the "list box 4" 333 includes α, β and γ. The "C-group box" 340 has a "C . . . " button 341.

FIG. 12 is a block diagram illustrating the configuration of the menus shown in FIG. 11. The main dialog 300 has two child dialogs, i.e., a "menu 1" dialog 301A and a "menu 2" dialog 302A.

The "menu 1" dialog 301A has the "A-group box" 320, the "B-group box" 330 and the "C-group box" 340. The "A-group box" 320 has a setting item (radio button control) 321, which is currently set to "1". The "B-group box" 330 has a setting item ("check box 3") 331 and a setting item ("list box 4") 333, which are set to OFF and "α", respectively.

The "C-group box" 340 has the "C . . . " button 341. A c-dialog box is present in front of the "C . . . " button 341 (the description of the c-dialog box will be omitted).

In the conventional user interfaces, however, when the number of setting items is large, it is necessary to perform an operation of opening/closing several dialogs before reaching a setting dialog (window).

Furthermore, it is not clear in which dialog a specific set item is present. It is also difficult to grasp correlation between dialogs. In addition, it is not clear in which menu hierarchy a setting item is present.

SUMMARY OF THE INVENTION

It is an object of the present invention to provide an information processing apparatus, a user-interface control method and a storage medium which allow shifting to a setting object, such as a dialog or a window having a specific setting item, by a single operation even if the number of setting items is large.

It is another object of the present invention to provide an information processing apparatus, a user-interface control method and a storage medium which can clearly indicate the position of a dialog or a group having a specific setting item.

It is still another object of the present invention to provide an information processing apparatus, a user-interface control method and a storage medium which can clearly indicate correlation among dialogs.

It is yet another object of the present invention to provide an information processing apparatus, a user-interface control method and a storage medium which can clearly indicate that in which menu hierarchy a setting item is present.

It is yet a further object of the present invention to provide an information processing apparatus, a user-interface control method and a storage medium which can dissolve demerits of a method for displaying a dialog without imparing merits thereof.

According to one aspect, the present invention which achieves these objectives relates to an information processing apparatus for displaying a menu and setting a setting object developed from the menu. The apparatus includes acquisition means for acquiring a configuration of the menu, block display means for displaying a block menu in which the acquired menu configuration is represented by blocks, and assignment means for assigning a control item included in the displayed block menu.

According to another aspect, the present invention which achieves these objectives relates to a user-interface control method for displaying a menu and setting a setting object developed from the menu. The method includes the steps of acquiring a configuration of the menu, displaying a block menu in which the acquired menu configuration is represented by blocks, and assigning a control item included in the displayed block menu.

According to still another aspect, the present invention which achieves these objectives relates to a storage medium storing a program in which a menu is displayed and a central processing unit within an information processing apparatus sets a setting object developed from the menu. The program-includes a procedure of acquiring a configuration of the menu, a procedure of displaying a block menu in which the acquired menu configuration is represented by blocks, a procedure of assigning a control item included in the displayed block menu, and a procedure of displaying the setting object by segmenting the assigned control item.

The foregoing objects, advantages and features of the present invention will become more apparent from the following detailed description of the preferred embodiments taken in conjunction with the accompanying drawings.

DETAILED DESCRIPTION OF THE PREFERRED EMBODIMENTS

A description will now be provided of an information processing apparatus, a user-interface control method and a storage medium according to an embodiment of the present invention.

Figure 1:
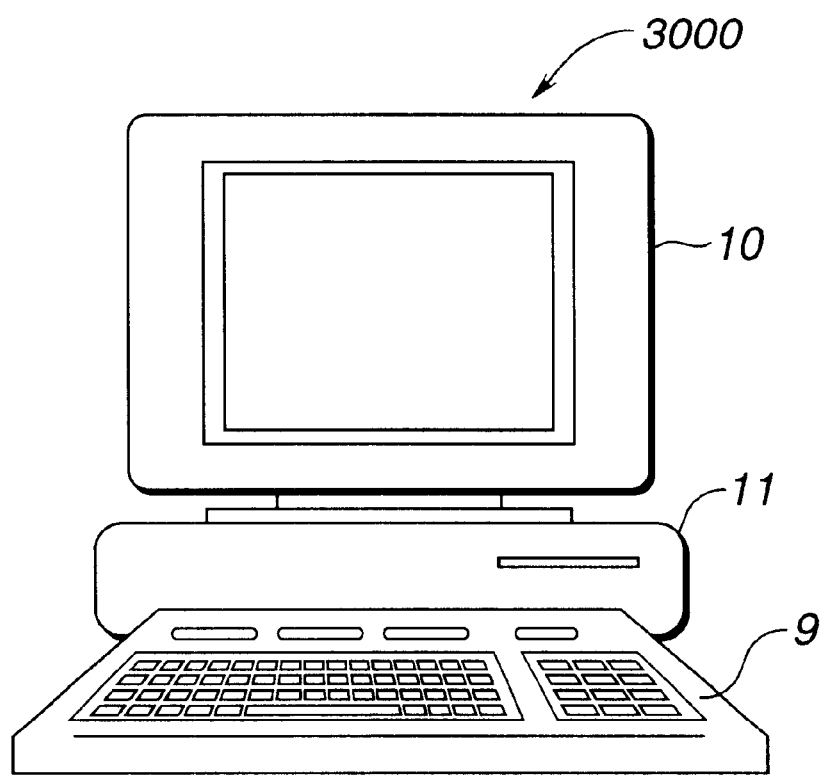
FIG. 1 is a diagram illustrating an external appearance of an information processing apparatus to which a user interface is applied according to an embodiment of the present invention.

FIG. 1 is a diagram illustrating an information processing apparatus to which a user interface is applied according to the embodiment. A host computer 3000, serving as the information processing apparatus, includes a keyboard 9 for receiving an input from a user, a CRT (cathode-ray tube) 10 for displaying an output to the user, an external memory 11 where data and programs are stored, and the like.

Figure 2:
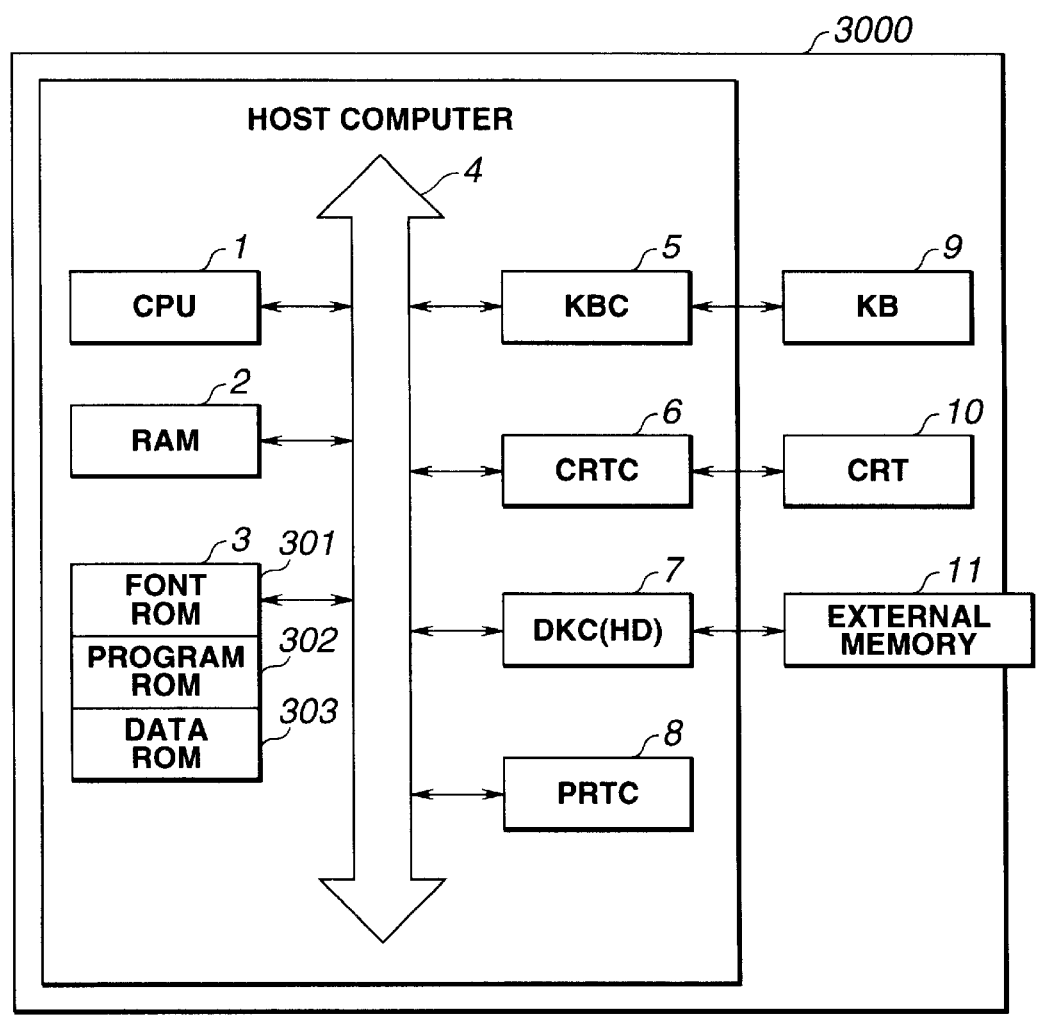
FIG. 2 is a block diagram illustrating the configuration of the information processing apparatus.

FIG. 2 is a block diagram illustrating the configuration of the host computer 3000. In FIG. 2, reference numeral 3 represents a ROM (read-only memory). Based on application programs stored in a program ROM 302 of the ROM 3, a CPU (central processing unit) 1 executes processing of documents. including figures, images, characters, tables (including table calculation and the like) and the like, and controls respective devices connected to a system bus 4.

Figure 6:
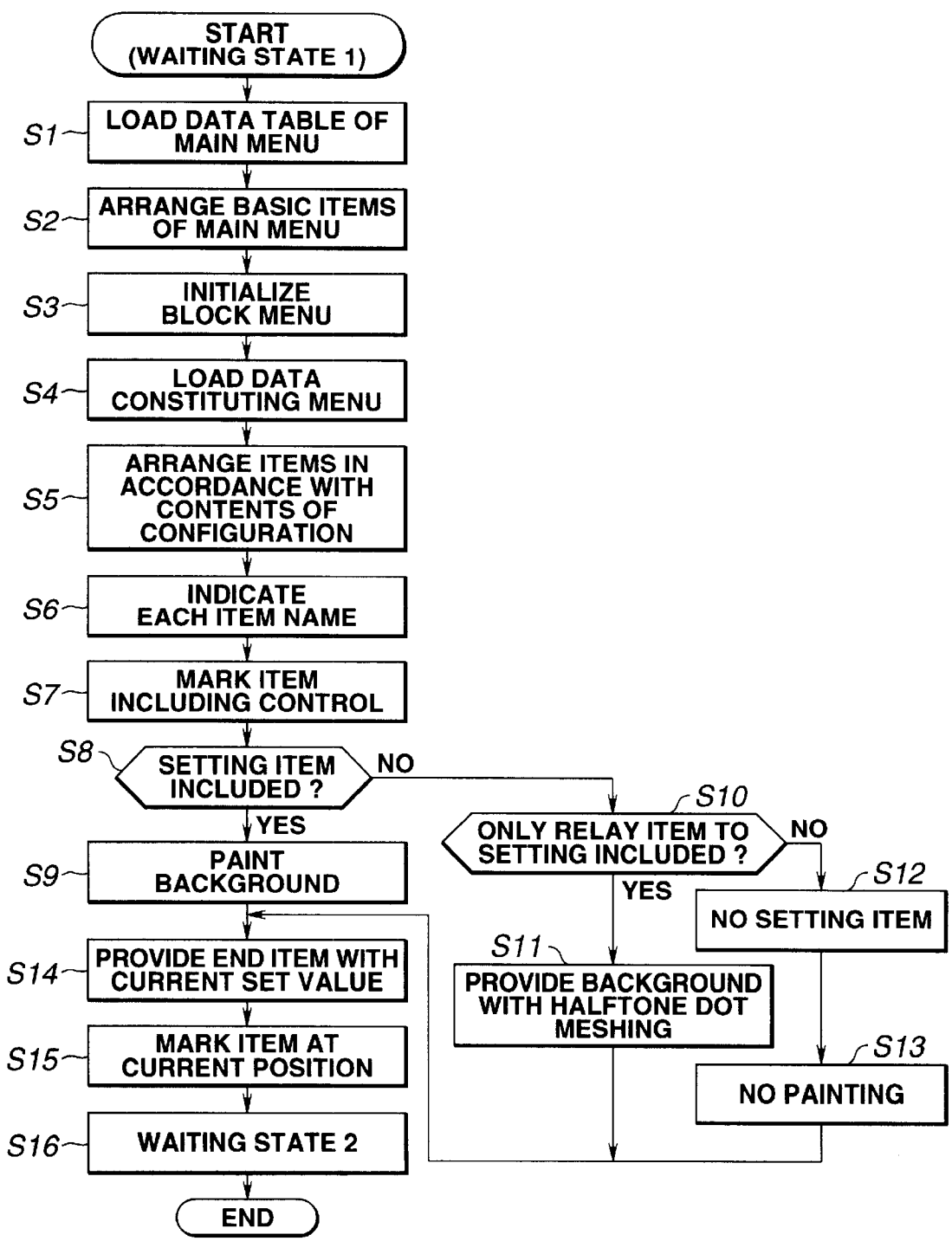
FIG. 6 is a flowchart illustrating a processing procedure for initializing a block menu.
Figure 7:
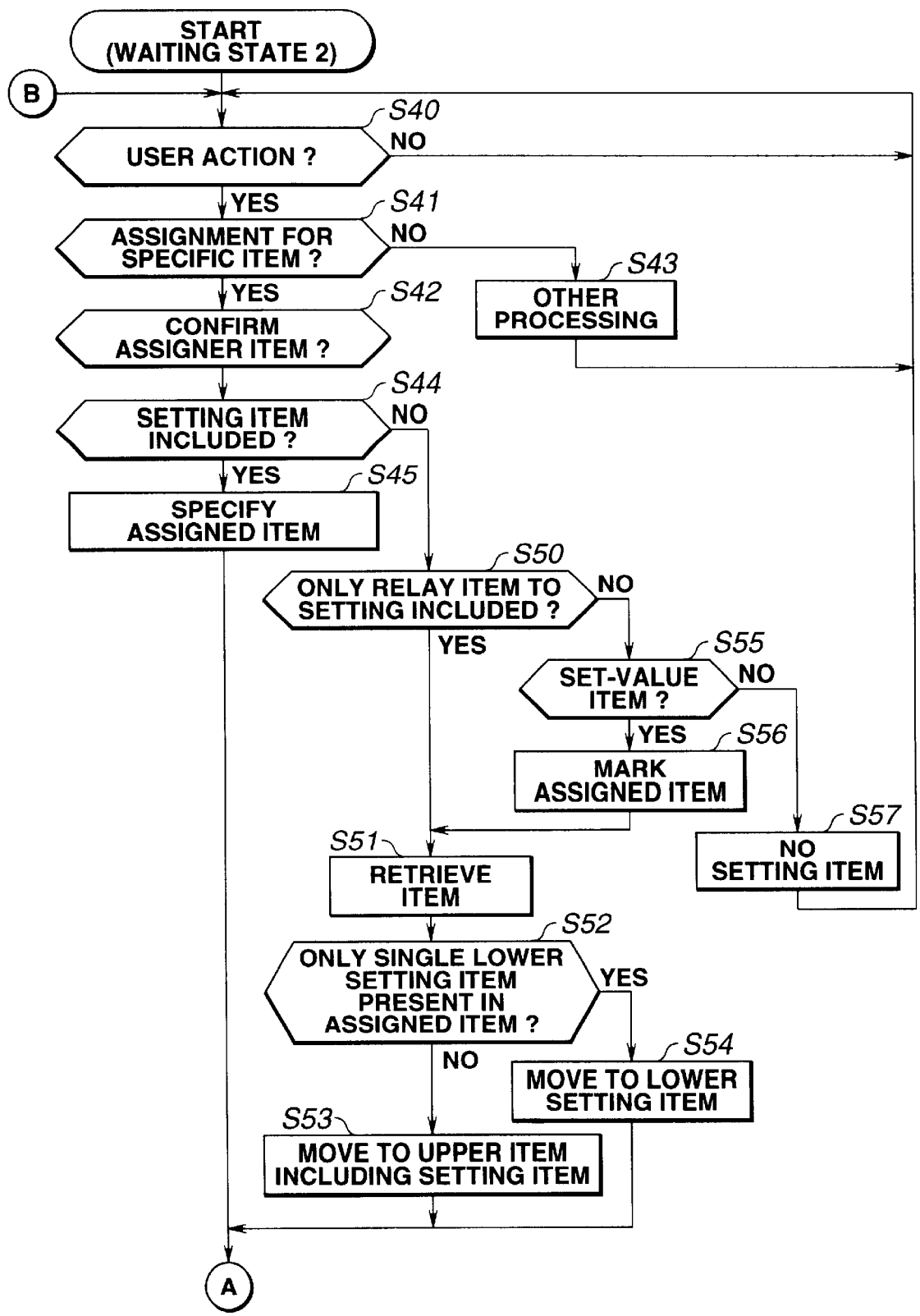
FIG. 7 is a flowchart illustrating a processing procedure for a block menu.
Figure 8:
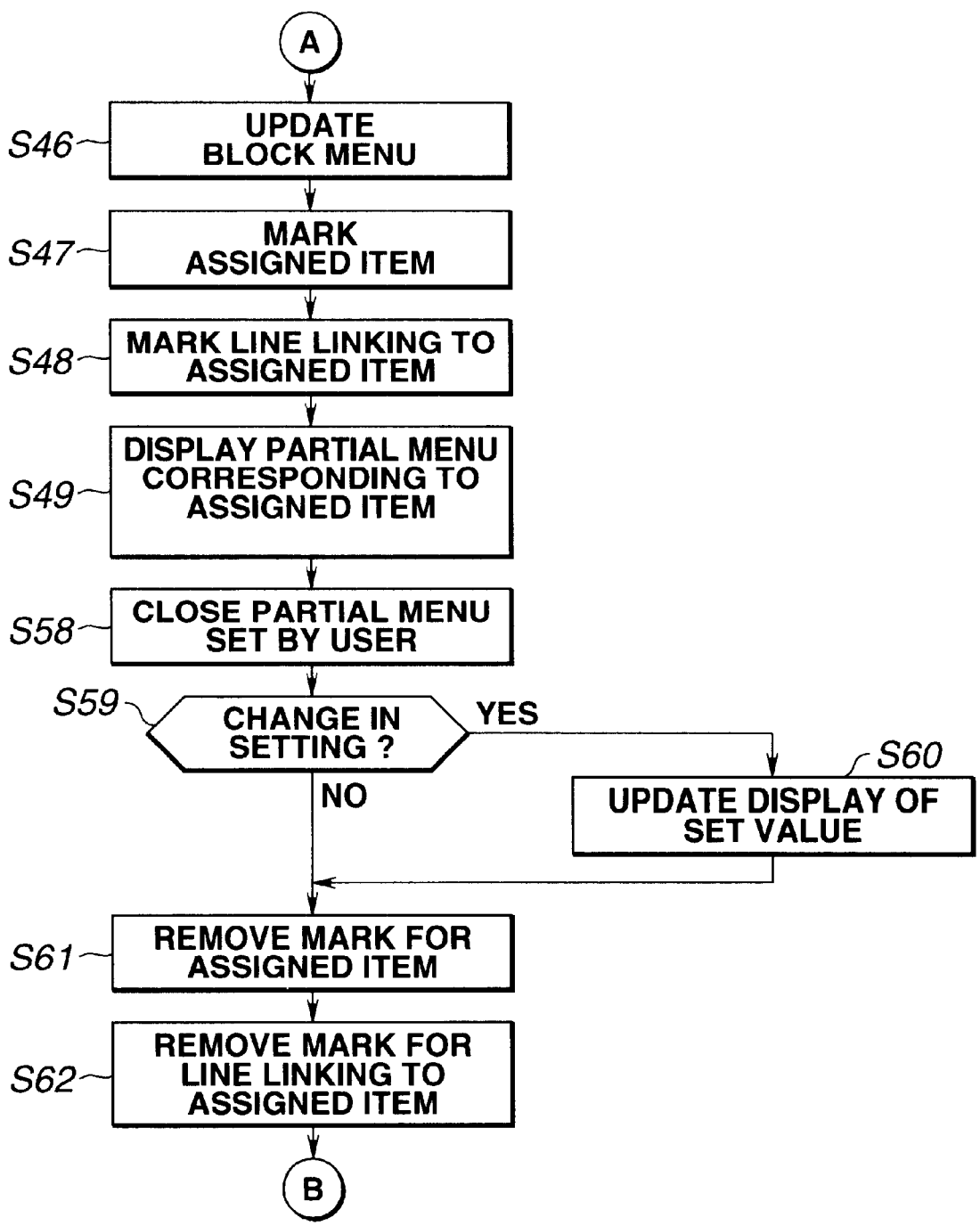
FIG. 8 is a flowchart illustrating a processing procedure for the block menu which succeeds the procedure shown in FIG. 7.

The program ROM 302 stores programs to be executed by the CPU 1 as shown in the flowcharts of FIGS. 6, 7 and 8 (to be described later).

A font ROM 301 of the ROM 3 stores, for example, font data to be used for generating character patterns for displaying document data edited/formed in the above-described document processing on the CRT 10.

A data ROM 303 of the ROM 3 stores various data to be used for the document processing, the display processing and the like (for example, directory information, printer-driver table, and the like).

A RAM (random access memory) 2 operates as a main memory, a working area or the like of the CPU 1. Although in this embodiment, control programs to be executed by the CPU 1 are stored in the program ROM 302, these programs may also be executed by the CPU 1 in a state of being stored in the external memory 11, such as a floppy disk, a CD (compact disc)-ROM or the like.

A keyboard controller (KBC) 5 controls a key input from a keyboard 9 or a pointing device (not shown). A CRT controller (CRTC) 6 controls the display of the CRT 10. A disk controller (DKC) 7 controls access to the external memory 11, such as a hard disk (HD), a floppy disk (FD), a CD-ROM or the like, which stores boot programs, various application programs, font data, user files, editing files and the like.

A printer controller (PRTC) 8 executes communication control processing by being connected to a printer via a predetermined two-way interface (not shown).

The CPU 1 executes, for example, processing of developing (rasterizing) an outline font in a display-information RAM (VRAM) set in the RAM 2 so as to allow WYSIWYG (What You See is What You Get) on the CRT 10. The CPU 1 also executes all kinds of data processing by opening various windows registered based on commands assigned through a mouse cursor (not shown) or the like.

Figure 3:
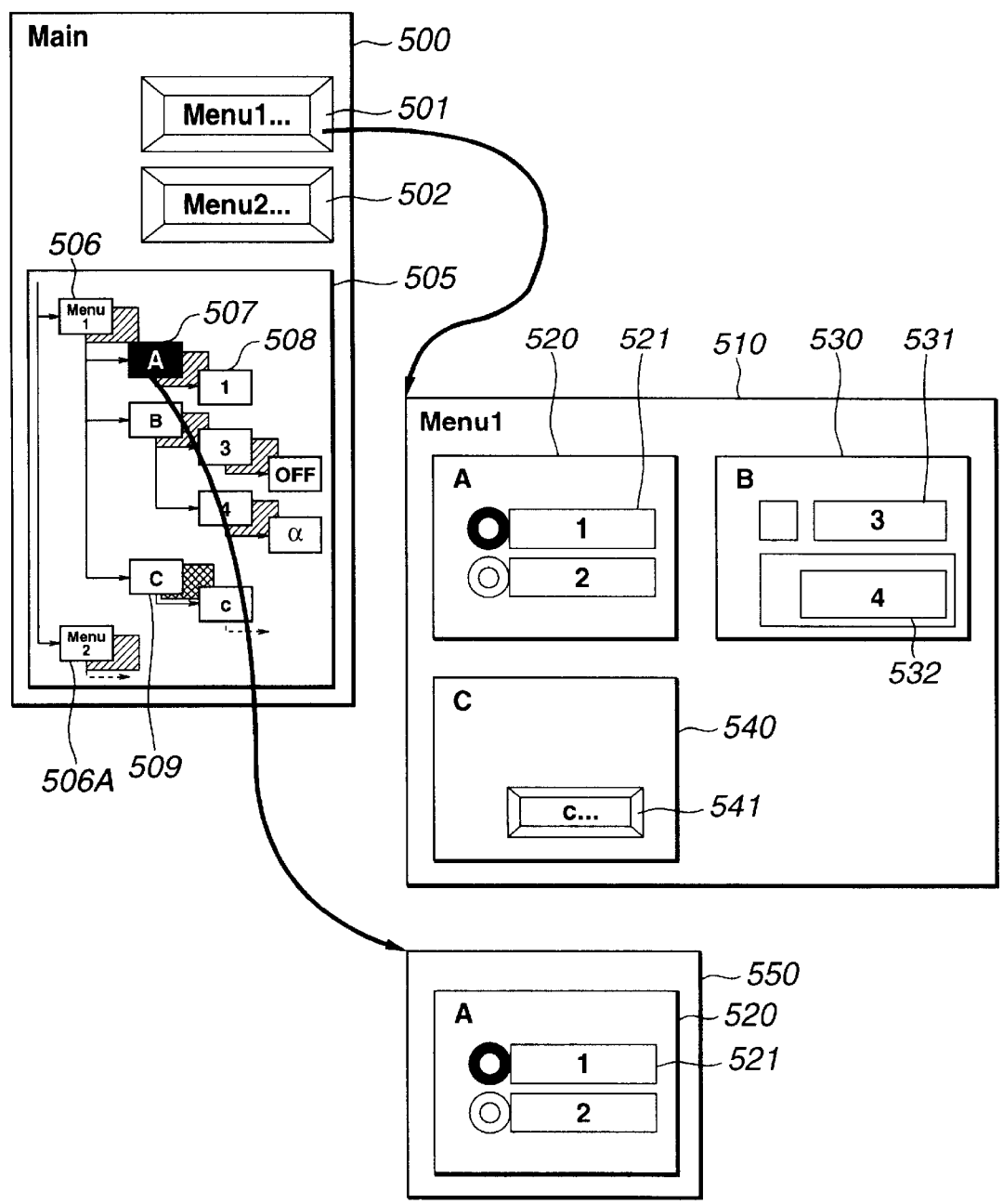
FIG. 3 is a diagram illustrating a menu display in the information processing apparatus.

A menu display in the information processing apparatus of the embodiment having the above-described configuration will now be described. FIG. 3 is a diagram illustrating a menu display in the information processing apparatus. A main dialog 500 has a "menu 1 . . . " button 501, a "menu 2 . . . " button 502, and a block menu 505.

By depressing the "menu 1 . . . " button 501, a "menu 1" dialog 510 is opened. This dialog 510 has three group boxes, i.e., an "A-group box" 520, a "B-group box" 530, and a "C-group box" 540.

Figure 11:
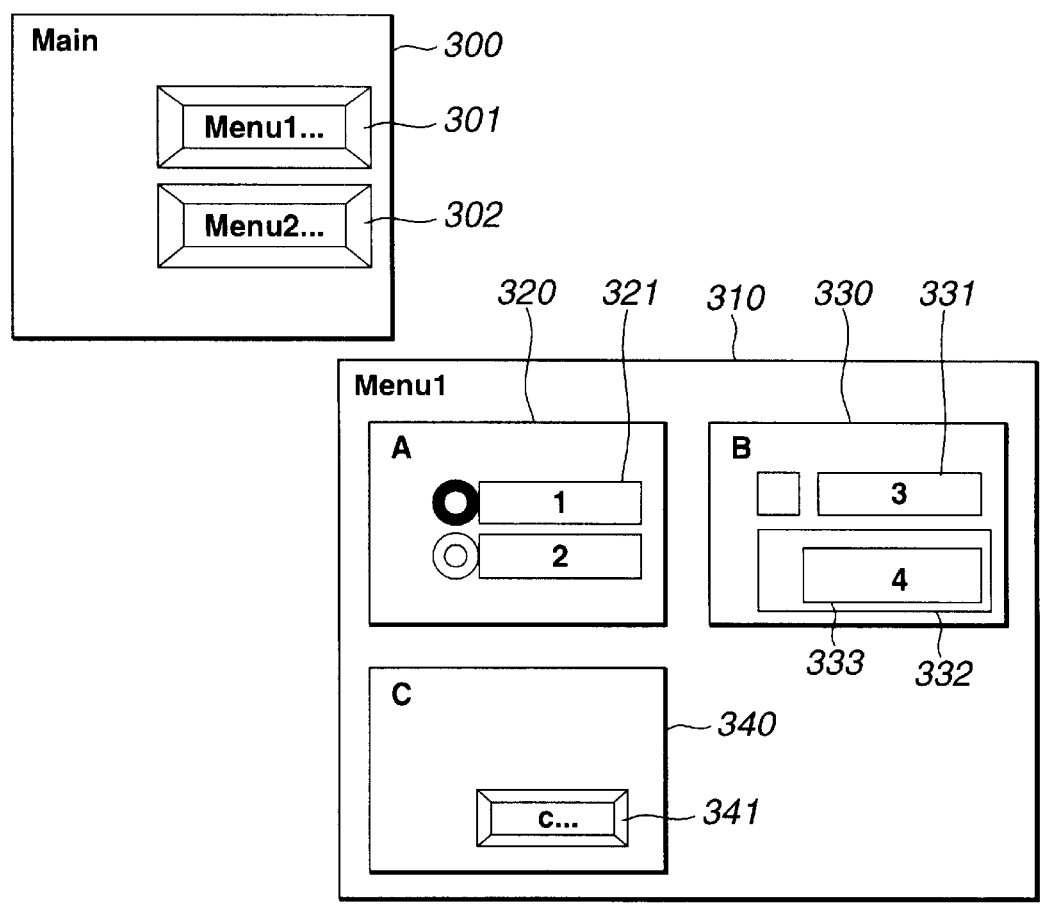
FIG. 11 is a diagram illustrating conventional menus using dialogs.
Figure 12:
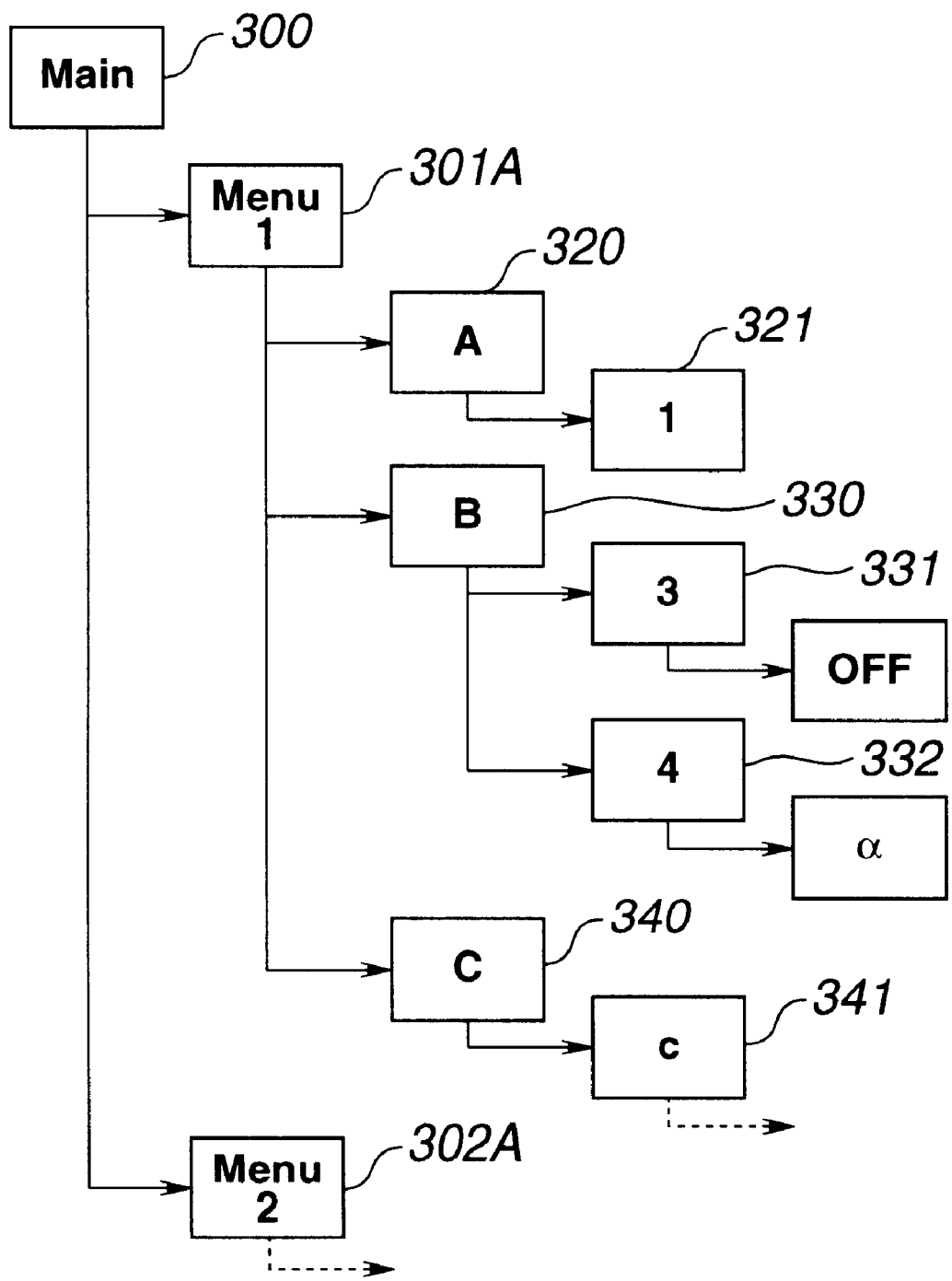
FIG. 12 is a block diagram illustrating the configuration of the menus shown in FIG. 11.

The "A-group box" 520 has two radio button controls 521 for selecting one of setting 1 and setting 2. The "B-group box" 530 has a "check box 3" 531 and a "list box 4" 532 for performing control. The "C-group box" 540 has a "C . . . " button 541. The "menu 1" dialog 510 is the same as the conventional dialog (see FIG. 11).

The block menu 505 has menus including child dialogs, and is configured by control items, each represented by a rectangle, and lines (link lines) indicating links between the control items. Current set values are also displayed. In the block menu 505, the main dialog comprises a control item (hereinafter abbreviated as an "item") 506 indicating a child dialog "menu 1", and an item 506A indicating a "menu 2".

The "menu 1" item 506 has child items, i.e., an "A" item 507 indicating an "A-group box" 520, a "B" item and a "C" item. The "A" item 507 has a set-value item 508, whose set value is displayed as "1".

At the same time, whether or not each item contains a setting item is represented by painting the background of the corresponding item box. For example, since the "menu 1" item 506 has a lower setting item, the background is painted. Similarly, since the "A" item 507 also has a lower setting item, the background is painted. Although the "C" item has a lower setting item, the direct link is only a button to a "c dialog", and the "C" item does not have a direct setting item. Hence, the background is provided with halftone dot meshing.

When a specific action (not limited to a particular action, for example, click, double click, a key operation or the like) has been performed for the "A" item 507 of the block menu 505, a menu 550 obtained by segmenting the portion of the dialog menu corresponding to the "A" item 507 (the "A group" 520) is displayed.

At Immediately before (or simultaneously with) the display of the menu 550, the painted color of the "A" item 507 of the block menu 505, and the color of the link line to the "A" item 507 are changed (so that the newly colored link line reaches the "A" item 507, whose color is also changed).

After the user has changed the setting in the menu 550, the menu 550 is closed, and the block menu 505 returns to the initial state.

Figure 4:
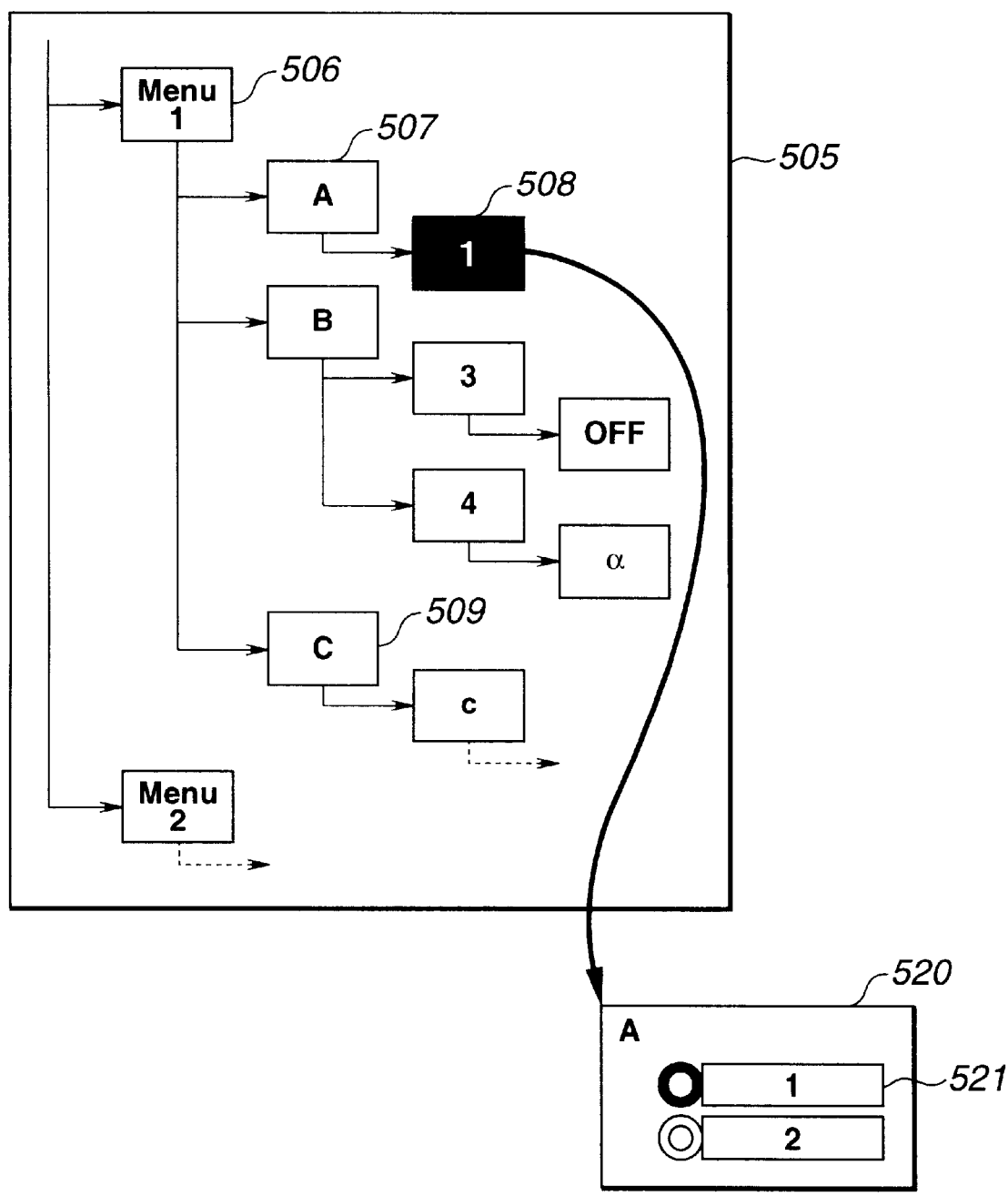
FIG. 4 is a diagram illustrating another form of display of the block menu 505 shown in FIG. 3.

FIG. 4 is a diagram illustrating another display state of the block menu 505 shown in FIG. 3. In FIG. 3, the case that the user has made an action for the "A" item 507, serving as a child item of the "menu 1" item 506 of the block menu 505 has been shown. In FIG. 4, however, the case that the user has made an action for the set-item value 508 is shown.

When there has been an action for the set-value item 508, a menu which is the same as the item 520 (the "A" item in this case) containing the set-value item is segmented. It is also possible to display only the setting item (radio button control) 521 by omitting the "A group".

Figure 5:
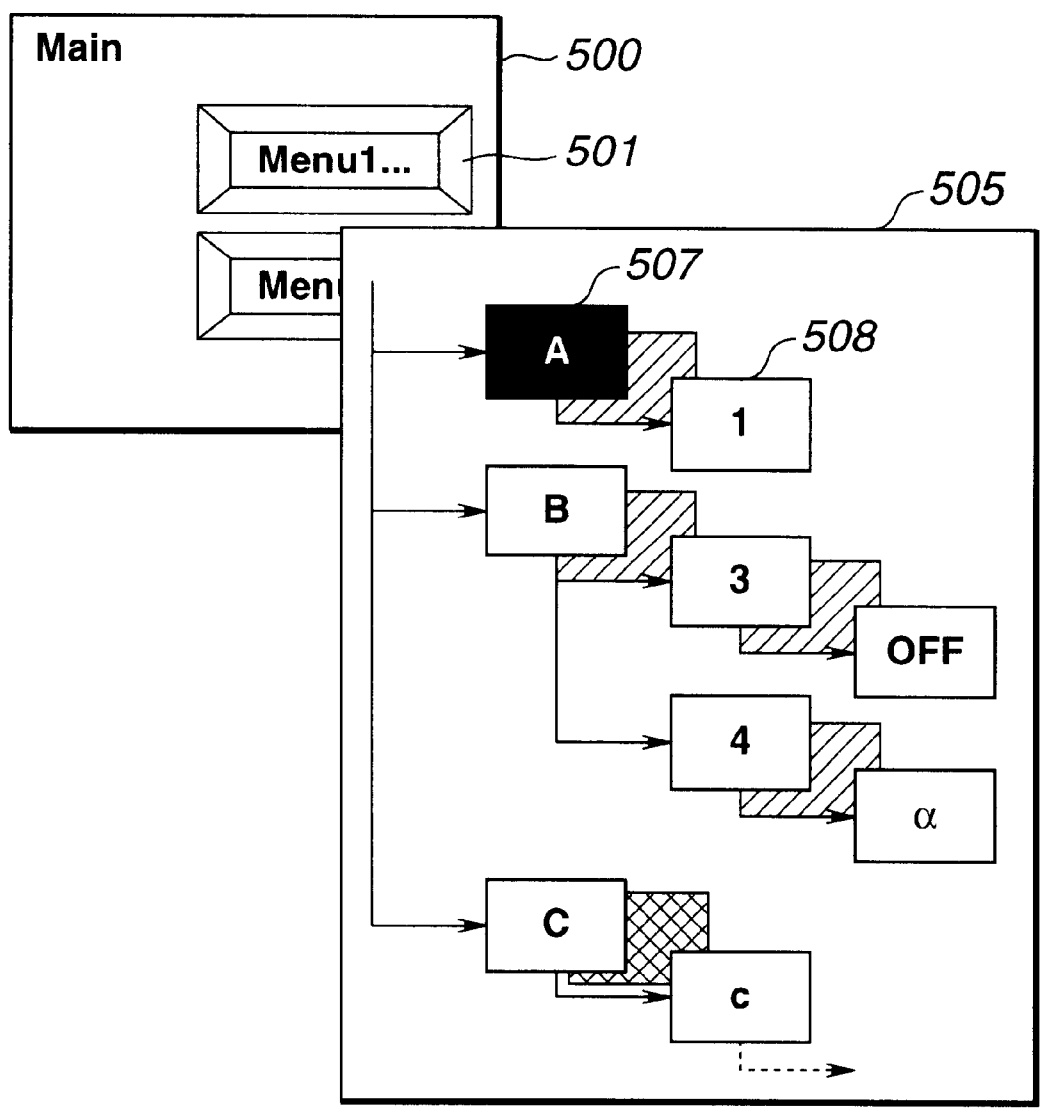
FIG. 5 is a diagram illustrating another form of display of the main menu 500 shown in FIG. 3.

FIG. 5 is a diagram illustrating another display state of the main menu 500 shown in FIG. 3. In FIG. 3, the block menu 505 is displayed on a specific area (at a separated position at the right of the main dialog 500. However, if there is a problem in the space for the menu, the block menu 505 may be displayed at a position near each control simultaneously with the user's assigning action.

When an assigning action has been performed for the "menu 1 . . . "button 501 of the main menu 500, the block menu 505 is displayed at the position shown in FIG. 5. The subsequent operation relating to the "A" item 507 and the set-value item 508 is the same as in the above-described case.

By thus separately performing movement of items for the main menu 500 and the block menu 505 in the form of a dialog, it is possible to reduce the number of steps of the user's actions. Since the block menu 505 has the role of an indicator having a menu structure, and it is possible to display the position of a moved set value in the configuration either in the form of a dialog or in the form of a block menu, the user need not be annoyed with correlation among dialogs and the positions of setting items in the entire menu.

Next, a description will be provided of the processing of an application program for controlling the user interface shown in FIGS. 3 through 5. This application program is stored in the program ROM 302, and is executed by the CPU 1.

FIG. 6 is a flowchart illustrating a processing procedure for initializing the block menu. In the processing procedure for initializing the block menu, the application program is in a waiting state 1. When displaying the main menu, a data table for the menu is loaded from the external memory 11 into the RAM 2 (step S1). Based on the data loaded in the RAM 2, basic items, such as the "menu 1 . . . " and the like, are arranged (step S2).

Then, the block menu is initialized (step S3), and data constituting the menu is read (step S4). The data constituting the menu may be read into the RAM 2 simultaneously with the reading of the data table performed in step S2.

Then, the processing of forming data for arranging items in the RAM 2 in accordance with the configuration of the menu is started (step S5). The name of each item is stored simultaneously with the arrangement of the items (step S6), and whether or not the concerned item includes a control, i.e., a setting item, is checked and an item including a control is marked (step S7).

If the concerned item includes a setting item as a result of determination in step S8, the background for that item is painted (step S9). If the concerned item includes only a relay item to certain setting as a result of determination in step S10, the background for that item is provided with halftone dot meshing (step S11). If the concerned item does not include a setting item (step S12), the background for that item is not painted (step S13).

When the process has reached a setting item at an end position by performing processing while arranging each item and link line, an item having the current value is formed (step S14).

A block list is completed by marking the item corresponding to the current position, and the completed main menu is displayed on the CRT 10 (step S15).

Then, the application program moves to a waiting state 2 which is a state of awaiting an input to the main menu (step S16), and the initializing processing is terminated.

FIGS. 7 and 8 are flowcharts illustrating a processing procedure for the block menu. When an input from the user through the keyboard 9 or the like has been provided in the waiting state 2 (step S40), it is then determined if the input is assignment for a specific item within the block menu (step S41). If the result of the determination in step S41 is affirmative, the assignment is confirmed (step S42). If the result of the determination in step S41 is negative, other processing is performed (step S43), and the process returns to step S40.

Processing corresponding to the item for which assignment has been confirmed in step S42 is performed. That is, if the item includes a setting item as a result of determination in step S44, the assigned item (including loading of basic-menu data corresponding to the item) is specified in step S45. Then, the block menu is updated (step S46), the assigned item is marked, for example, by painting the inside of the assigned item (step S47), and a line (link line) linking to the assigned item is also marked (step S48). For example, a line from the concerned item of the main menu to the assigned item is newly provided in another color, and a partial menu corresponding to the assigned item is displayed on the CRT 10 (step S49).

If the result of the determination in step S44 is negative, i.e., if the item comprises only a relay item to a setting item (step S50), retrieval of the item (including, for example, loading of basic-menu data corresponding to the item) is performed (step S51).

Then, it is determined if only a single lower setting item is present in the assigned item (step S52). If a plurality of lower setting items are present as the result of the determination in step S52, the item is temporarily moved to a position passing through the relay item (step S53). At that time, menu data to be subjected to menu display is internally changed without changing the display. On the other hand, if the result of the determination in step S52 is affirmative, the process is temporarily moved to the setting item (step S54).

If the item for which assignment has been confirmed in step S42 is a set-value item as a result of determination in step S55, a mark is provided on the display of the set-value item (step S56), and the process proceeds to the above-described processing of step S51. Even if the contents of the assigned item differ, the processing starting from step S46 is common.

If the item for whom assignment has been confirmed in step S42 does not include a setting item (step S57), the process returns to step S40.

Upon completion of the setting by the user, the partial menu opened from the block menu is closed (step S58). It is then, determined if there is a change in the setting (step S59). If the result of the determination in step S59 is affirmative, the display of the set value of the set-value item is updated (step S60), and the mark provided for the assigned item is removed, for example, by erasing the paint within the item (step S61), and the mark provided for the line linked to the assigned item is also removed (step S63). At that time, the line (link line) from the concerned item of the main menu to the assigned item is newly drawn in the original color. The process then returns to the waiting state 2, which is the state when the main menu has been displayed.

In the above-described embodiment, the present invention is also applicable to a case in which the portion of the dialog and the description is changed to a window, and the menu is displayed in the form of a window instead of the form of a dialog.

Other Embodiments

Figure 9:
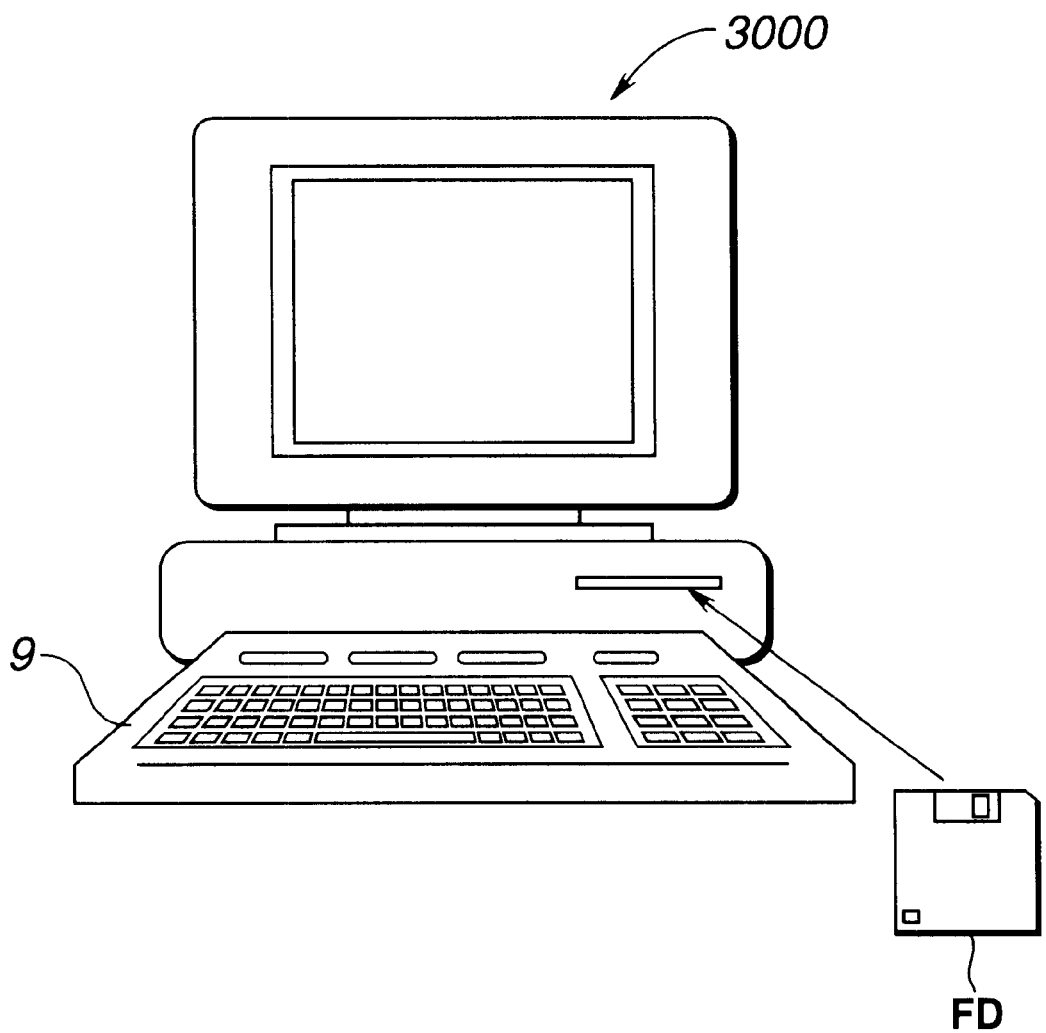
FIG. 9 is a diagram illustrating a state in which a floppy disk (FD), serving as an external memory, is loaded in a host computer 3000, and a program stored in the FD is used by being loaded in the host computer 3000.

FIG. 9 is a diagram illustrating a state in which a floppy disk (FD), serving as an external memory, is loaded in a host computer 3000, and a program stored in the FD is used by being loaded in the host computer 3000.

Figure 10:
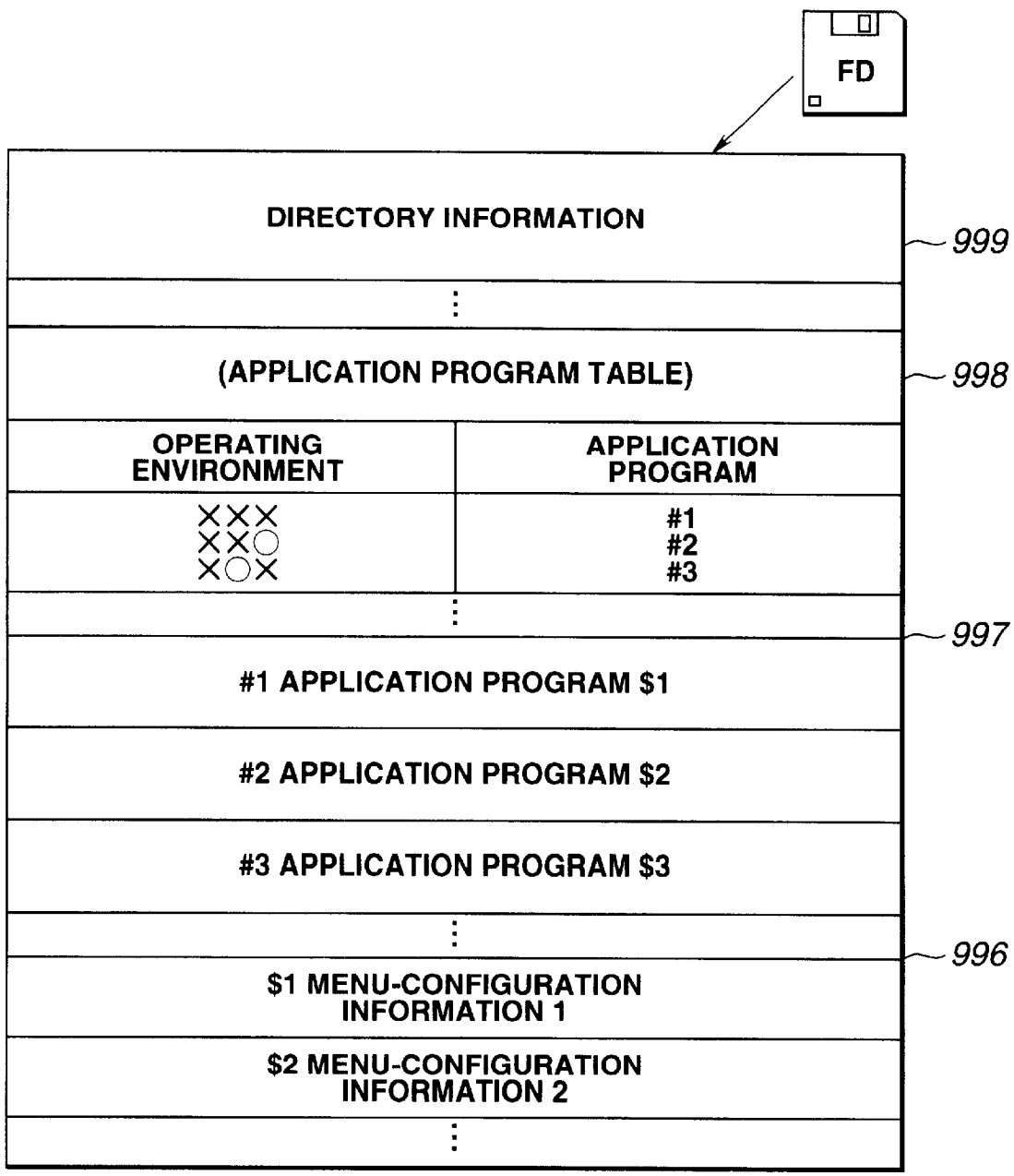
FIG. 10 is a diagram illustrating a memory map of the floppy disk shown in FIG. 9.

FIG. 10 is a diagram illustrating a memory map of the floppy disk shown in FIG. 9. In FIG. 10, a region 999 stores directory information, which indicates a location where an application program table 998 is stored.

The directory information 999 also indicates a location (region) 997 where a printer control program (#1) represented by XXX is stored, and a location (region) 996 where information relating to the configuration of each menu is stored.

By assigning the name of a desired printer to be installed from the stored contents of the FD by the operator of the host computer 3000, an application program is loaded by referring to the application program table 998. For example, when an operating environment XXX has been assigned, the #1 application program and the configuration information stored in the regions 997 and 996, respectively, can be loaded into the host computer 3000.

The present invention may be applied to a system comprising a plurality of apparatuses, or to an apparatus comprising a single unit. The present invention may, of course, be applied to a case in which the objects of the invention are achieved by supplying a system or an apparatus with a program. In such a case, a storage medium storing such a program constitutes the present invention. By reading program codes from the storage medium into the system or the apparatus, the system or the apparatus operates in a predetermined manner.

For example, a floppy disk, a hard disk, an optical disk, a magnetooptical disk, a CD-ROM, a CD-R (recordable), a magnetic tape, a nonvolatile memory card, a ROM or the like may be used as the storage medium for supplying the program codes.

The present invention may be applied not only to a case in which the functions of the above-described embodiments are realized by executing program codes read by a computer, but also to a case in which an OS (operating system) or the like operating in a computer executes a part or the entirety of actual processing, and the functions of the above-described embodiments are realized by the processing.

The present invention may also be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiments are realized by the processing.

According to the information processing apparatus of the present invention, when displaying a menu and setting a setting object developed from the menu, a configuration of the menu is acquired by acquisition means, a block menu in which the acquired menu configuration is represented by blocks is displayed by block display means, and a control item included in the displayed block menu is assigned by assignment means. Hence, even if the number of setting items is large, the apparatus allows shift to a setting object, such as a setting dialog or window having a specific setting item by a single operation. The same effects can also be obtained in the user-interface control method of the present invention.

According to the storage medium of the present invention storing a program in which a menu is displayed and a central processing unit within an information processing apparatus sets a setting object developed from the menu, the program includes a procedure of acquiring a configuration of the menu, a procedure of displaying a block menu in which the acquired menu configuration is represented by blocks, a procedure of assigning a control item included in the displayed block menu, and a procedure of displaying the setting object by segmenting the assigned control item. Hence, it is possible to improve the flexibility and the expandability of a user interface in an information processing apparatus.

The individual components shown in outline or designated by blocks in the drawings are all well-known in the information processing apparatus and the user-interface control method arts and their specific construction and operation are not critical to the operation or the best mode for carrying out the invention.

While the present invention has been described with respect to what are presently considered to the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus for displaying a menu and setting a setting object selected from the menu, said apparatus comprising:

acquisition means for acquiring a configuration of the menu;

block display means for displaying a block menu in which the acquired menu configuration is represented by blocks such that the blocks that contain a direct link to a setting object have a background painted with oblique lines; and assignment means for assigning a control item included in the displayed block menu, wherein said block display means indicates a link line to the assigned control item.

2. An information processing apparatus according to claim 1, further comprising segmenting displaying means for displaying the setting object by segmenting the assigned control item.

3. An information processing apparatus according to claim 2, wherein said block display means indicates a position of the assigned control item in the block menu.

4. An information processing apparatus according to claim 2, wherein said block display means changes a position of the displayed control item when segmenting and displaying the control item.

5. An information processing apparatus according to claim 1, wherein said block display means displays the block menu in the form of a dialog.

6. A user-interface control method for displaying a menu and setting a setting object selected from the menu, said method comprising the steps of:

acquiring a configuration of the menu;

displaying a block menu in which the acquired menu configuration is represented by blocks such that the blocks that contain a direct link to a setting object have a background painted with oblique lines; and assigning a control item included in the displayed block menu, wherein said displaying step indicates a link line to the assigned control item.

7. A user-interface control method according to claim 6, further comprising the step of displaying the setting object by segmenting the assigned control item.

8. A user-interface control method according to claim 7, wherein a position of the assigned control item in the block menu is indicated.

9. A user-interface control method according to claim 7, wherein a position of the displayed control item is changed when segmenting and displaying the control item.

10. A user-interface control method according to claim 6, wherein the block menu is displayed in the form of a dialog.

11. A storage medium storing a program in which a menu is displayed, and a central processing unit within an information processing apparatus sets a setting object selected from the menu, said program comprising:

a procedure of acquiring a configuration of the menu;

a procedure of displaying a block menu in which the acquired menu configuration is represented by blocks such that the blocks that contain a direct link to a setting object have a background painted with oblique lines;

a procedure of assigning a control item included in the displayed block menu; and a procedure of displaying the setting object by segmenting the assigned control item, wherein said procedure of displaying a block menu indicates a link line to the assigned control item.

12. A storage medium according to claim 11, wherein said storage medium is detachably mountable in the information processing apparatus.

13. A storage medium according to claim 12, wherein said storage medium comprises a CD-ROM or a floppy disk.

14. A storage medium according to claim 11, wherein a position of the assigned control item in the block menu is indicated.

15. A storage medium according to claim 11, wherein a position of the displayed control item is changed when segmenting and displaying the control item.

16. A storage medium according to claim 11, wherein the block menu is displayed in the form of a dialog.

17. An information processing apparatus for displaying a menu, said apparatus comprising:

acquisition means for acquiring a configuration of the menu;

menu display means for displaying a menu including menu buttons and a block menu in which the acquired menu configuration is represented by blocks;

assignment means for assigning the menu button or a control item included in the displayed block menu;

display control means for displaying a dialog box including group boxes when the menu button was assigned by said assignment means, or a menu button corresponding to the control item when the control item was assigned by said assignment means, wherein said menu display means indicates a direct link line to the assigned control item by a background painted with oblique lines.

18. An information processing apparatus according to claim 17, further comprising segmenting/displaying means for displaying a setting object by segmenting the assigned control item.

19. An information processing apparatus according to claim 18, wherein said menu display means indicates a position of the assigned control item in the block menu.

20. An information processing apparatus according to claim 18, wherein said menu display means changes a position of the displayed control item when segmenting and displaying the control item.

21. An information processing apparatus according to claim 17, wherein said menu display means displays the block menu in the form of a dialog.

22. An information processing method for displaying a menu, said method comprising the steps of:

acquiring a configuration of the menu;

displaying a menu including menu buttons and a block menu in which the acquired menu configuration is represented by blocks;

assigning the menu button or a control item included in the displayed block menu;

displaying a dialog box including group boxes when the menu button was assigned by said assignment means, or a menu button corresponding to the control item when the control item was assigned by said assignment means, wherein the displaying menu step indicates a direct link line to the assigned control item by a background painted with oblique lines.

23. An information processing method according to claim 22, further comprising segmenting/displaying step for displaying a setting object by segmenting the assigned control item.

24. An information processing method according to claim 23, wherein the displaying menu step indicates a position of the assigned control item in the block menu.

25. An information processing method according to claim 23, wherein the displaying menu step changes a position of the displayed control item when segmenting and displaying the control item.

26. An information processing method according to claim 23, wherein the displaying menu step displays the block menu in the form of a dialog.

* * * * *

UNITED STATES PATENT AND TRADEMARK OFFICE
CERTIFICATE OF CORRECTION

PATENT NO.    : 6,407,760 B1
DATED         : June 18, 2002
INVENTOR(S)   : Aritomi It is certified that error appears in the above-identified patent and that said Letters Patent is hereby corrected as shown below:

Title page,
Item [56], References Cited, before OTHER PUBLICATIONS, the following should be inserted:
-- FOREIGN PATENT DOCUMENTS
EP 0 123 456 A2             1/2000 --.

Column 2,
Line 42, "program-" should read -- program --.

Column 3,
Line 38, "documents." should read -- documents --.

Column 4,
Line 54, "At Immediately" should read -- Immediately --.

Column 7,
Line 49, "entirey" should read -- entirety --.

Column 8,
Line 52, "segmenting displaying" should read -- segmenting/displaying --.

Column 10,
Line 32, "menu;" should read -- meun; and --.

Signed and Sealed this

Twenty-second Day of April, 2003

JAMES E. ROGAN
*Director of the United States Patent and Trademark Office*